(12) United States Patent
Ross et al.

(10) Patent No.: US 10,026,129 B1
(45) Date of Patent: Jul. 17, 2018

(54) ANALYTICAL METHODS AND TOOLS FOR DETERMINING NEEDS OF ORPHAN POLICYHOLDERS

(71) Applicant: MASSACHUSETTS MUTUAL LIFE INSURANCE COMPANY, Springfield, MA (US)

(72) Inventors: Gareth Ross, Amherst, MA (US); Tricia Walker, West Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 694 days.

(21) Appl. No.: 14/576,440

(22) Filed: Dec. 19, 2014

Related U.S. Application Data (60) Provisional application No. 61/920,049, filed on Dec. 23, 2013.

(51) Int. Cl.
G06Q 40/08 (2012.01)
G06Q 30/02 (2012.01)

(52) U.S. Cl.
CPC .................. *G06Q 40/08* (2013.01)

(58) Field of Classification Search
None
See application file for complete search history.

(56) References Cited

U.S. PATENT DOCUMENTS

| | | |
|---|---|---|
| 8,117,084 B2 | 2/2012 | Siegrist |
| 2001/0014868 A1* | 8/2001 | Herz ................ G06Q 10/0637 705/14.38 |
| 2002/0091613 A1* | 7/2002 | Kendall ................ G06Q 30/06 705/37 |
| 2002/0194050 A1 | 12/2002 | Nabe et al. |
| 2002/0194103 A1 | 12/2002 | Nabe |
| 2002/0194117 A1 | 12/2002 | Nabe et al. |
| 2003/0097329 A1 | 5/2003 | Nabe et al. |
| 2005/0097028 A1 | 5/2005 | Watanabe et al. |
| 2005/0251464 A1 | 11/2005 | Ames et al. |
| 2010/0100420 A1 | 4/2010 | Anderson et al. |
| 2011/0302079 A1 | 12/2011 | Neuhaus |
| 2011/0313835 A1 | 12/2011 | Falkenborg et al. |
| 2011/0313900 A1 | 12/2011 | Falkenborg et al. |
| 2012/0066065 A1 | 3/2012 | Switzer |
| 2012/0066084 A1 | 3/2012 | Sneyders |

(Continued)

OTHER PUBLICATIONS

Balan et al., Expert Views, "Taking Good Care of 'Orphans' is Key in Life Insurance", May 21, 2010, 6 pages.

(Continued)

*Primary Examiner* — Robert R Niquette
*Assistant Examiner* — Joseph W. King
(74) *Attorney, Agent, or Firm* — Eric L. Sophir; Dentons US LLP (57) ABSTRACT

A method for matching insurance products to orphan policyholders may enable an insurance company to automatically identify sales value and propensity to sales of a list of orphan policyholders, among other characteristics, by using collaborative filtering techniques and learning algorithms. The method may further enable automated marketing and sales and may reduce internal costs which may be further transferred to customers as a discount and provide a competitive edge within the insurance industry.

12 Claims, 4 Drawing Sheets

(56) References Cited

U.S. PATENT DOCUMENTS

| | | |
|---|---|---|
| 2012/0089454 A1 | 4/2012 | Chen |
| 2012/0265587 A1* | 10/2012 | Kinkead ................ G06Q 30/02 |
| | | 705/14.1 |
| 2013/0054334 A1 | 2/2013 | Ross et al. |
| 2013/0080244 A1 | 3/2013 | Person |
| 2013/0311283 A1 | 11/2013 | Liu et al. |
| 2014/0075004 A1 | 3/2014 | Van Dusen et al. |
| 2014/0279037 A1 | 9/2014 | Zimmerman et al. |
| 2014/0280554 A1 | 9/2014 | Webb et al. |
| 2014/0330559 A1 | 11/2014 | Higbie et al. |
| 2014/0358811 A1 | 12/2014 | Cama et al. |
| 2015/0106190 A1 | 4/2015 | Wang et al. |
| 2015/0112800 A1 | 4/2015 | Binion et al. |

OTHER PUBLICATIONS

Groner, Dennis, ThinkAdvisor, "Dealing With Orphan Policyholders", Apr. 29, 2010, 6 pages.
ThinkAdvisor, "Companies Finding New Ways to Service Orphan Policyholders", Feb. 10, 2008, 6 pages.

* cited by examiner

ANALYTICAL METHODS AND TOOLS FOR DETERMINING NEEDS OF ORPHAN POLICYHOLDERS

CROSS-REFERENCE TO RELATED APPLICATIONS

This application claims the benefit of the filing date of the U.S. Provisional Application No. 61/920,049, entitled "Analytical Methods and Tools For Determining Needs of Orphan Policyholders," filed on Dec. 23, 2013, which is incorporated herein by reference in its entirety.

This application relates to U.S. Provisional Patent Application Ser. No. 61/920,038, filed Dec. 23, 2013, U.S. Provisional Patent Application Ser. No. 61/920,028, filed on Dec. 23, 2013, and U.S. Provisional Patent Application Ser. No. 61/922,122, filed Dec. 31, 2013, all of which are incorporated by reference in their entirety.

FIELD OF THE INVENTION

The present disclosure relates in general to insurance and financial products, and more specifically, to a computer executed method for matching insurance products to orphaned policyholders.

BACKGROUND

Most insurance policies are sold by agents who are often the primary contact between an insurer and the customer. Typically, an agent provides important services to the customer during the renewal process that include various activities, such as, reminding the customer about renewals, collecting renewal premiums, and ensuring the customer receives receipts on time (e.g., for tax purposes), among others. Often times, however, customers no longer have an active agent servicing their policies.

The reasons for an agent not servicing a policyholder may vary. For example, the agent may no longer be working in the industry, may lack a relationship with the original issuing company (e.g., currently works for a different company), may simply neglect clientele, or have an inability to maintain contact with an expanding clientele. Whatever the reason, the result can negatively affect business as a policyholder may be a potential sales lead. For example, an agent is more likely to have a meeting with a policyholder than with a cold call prospect. However, if a customer bought a policy from an agent and has not heard from him/her again then the customer's next purchase is likely going to be from a different insurance company.

Insurance companies have tried to overcome this problem by implementing, through agents, programs which address the customer service, policy renewal, and additional needs of orphan policyholders. In these programs, orphan policyholders may be contacted one by one to determine their propensity to buy and potential sales value. However, this can be a time consuming process and can increase costs for the customer when agent commissions are taken into consideration. Therefore, the ability to cost-efficiently determine needs of orphan policyholders and match those needs to insurance products may be a requirement for insurance companies looking for a competitive advantage in the insurance industry.

SUMMARY

Systems and methods disclosed herein attempt to determine needs of orphan policyholders. An exemplary system and method may allow an insurance company to match insurance products to needs of orphan policyholders, evaluate propensity to buy, evaluate potential sales value, among other characteristics, and enable insurance companies to market orphan policyholders with non-commissioned products.

In one embodiment, the system and method for matching insurance products to orphan policyholders may be an integral part of a system for re-engagement of orphan policyholders. The system may process a previously identified list of orphan policyholder's profiles, may incorporate internal and external data, and may develop an analytical model for identifying insurance needs of orphan policyholders; for whose purpose it may use collaborative filtering techniques and learning algorithms.

Additionally, the system may process orphan policyholders identified needs, to determine potential sales value. Weight and confidence level may be associated to characteristics as they may be defined by the analytical model.

The system and method may enable for automated marketing of non-commissioned insurance products to orphan policyholders. Furthermore, by enabling automated marketing, it may allow to reduce costs which may be further transferred to customers as a discount and provide competitive edge within the insurance industry.

In one embodiment, a computer-executed method comprises generating, by an analytical engine of a computer, an analytical model based upon orphan policyholder profile data, available insurance products, and orphan policyholder purchase data to match an insurance product to an orphan policyholder, wherein the orphan policyholder is identified in a database as no longer having an agent engaged with that policyholder; mapping, by the analytical engine of the computer, policyholder value to propensity for sales associated with the orphan policyholder by executing the analytical model, the mapping including identifying the insurance product for the orphan policyholder; and automatically initiating, by the computer, an automated marketing communication session with the orphan policyholder based on the mapping.

In another embodiment, a system comprises a computer readable memory having stored thereon computer executable instructions for matching an insurance product to an orphan policyholder; and a processor coupled to the memory, the processor executing the instructions including: generating, by an analytical engine of a computer, an analytical model based upon orphan policyholder profile data, available insurance products, and orphan policyholder purchase data to match an insurance product to an orphan policyholder, wherein the orphan policyholder is identified in a database as no longer having an agent engaged with that policyholder; mapping, by the analytical engine of the computer, policyholder value to propensity for sales associated with the orphan policyholder by executing the analytical model, the mapping including identifying the insurance product for the orphan policyholder; and automatically initiating, by the computer, an automated marketing communication session with the orphan policyholder based on the mapping.

In yet another embodiment, a non-transitory computer readable medium having stored thereon computer executable instructions for matching an insurance product to an orphan policyholder is provided. The instructions including analyzing, by an analytical engine of a computer, a plurality of data sources to develop an analytical model for matching the insurance product to the orphan policyholder, and mapping, by the analytical engine of the computer, policyholder value to propensity for sales associated with the orphan policyholder by executing the analytical model; the mapping including identifying the insurance product for the orphan policyholder. The instructions further including initiating, by the computer, an automated marketing communication session with the orphan policyholder based on the mapping.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Agent" refers to an individual working for a company or as a broker with an interest in attracting new clients by analyzing their needs and wishes. An agent may specifically look for prospects with high referral potential. In addition, an agent may represent the intermediary between an issuing company and a client.

"Orphan policyholder" refers to an individual/company that was sold a policy by an agent who subsequently leaves the industry, no longer services the policyholder or no longer has a selling agreement with the issuing company.

"Analytical engine" refers to a software module that handles data integration, break data streams into parts, executes rules, and performs data matching by using fuzzy logic, among others.

"Analytical model" refers to a mathematical model into which data may be loaded for analysis.

Figure 1:
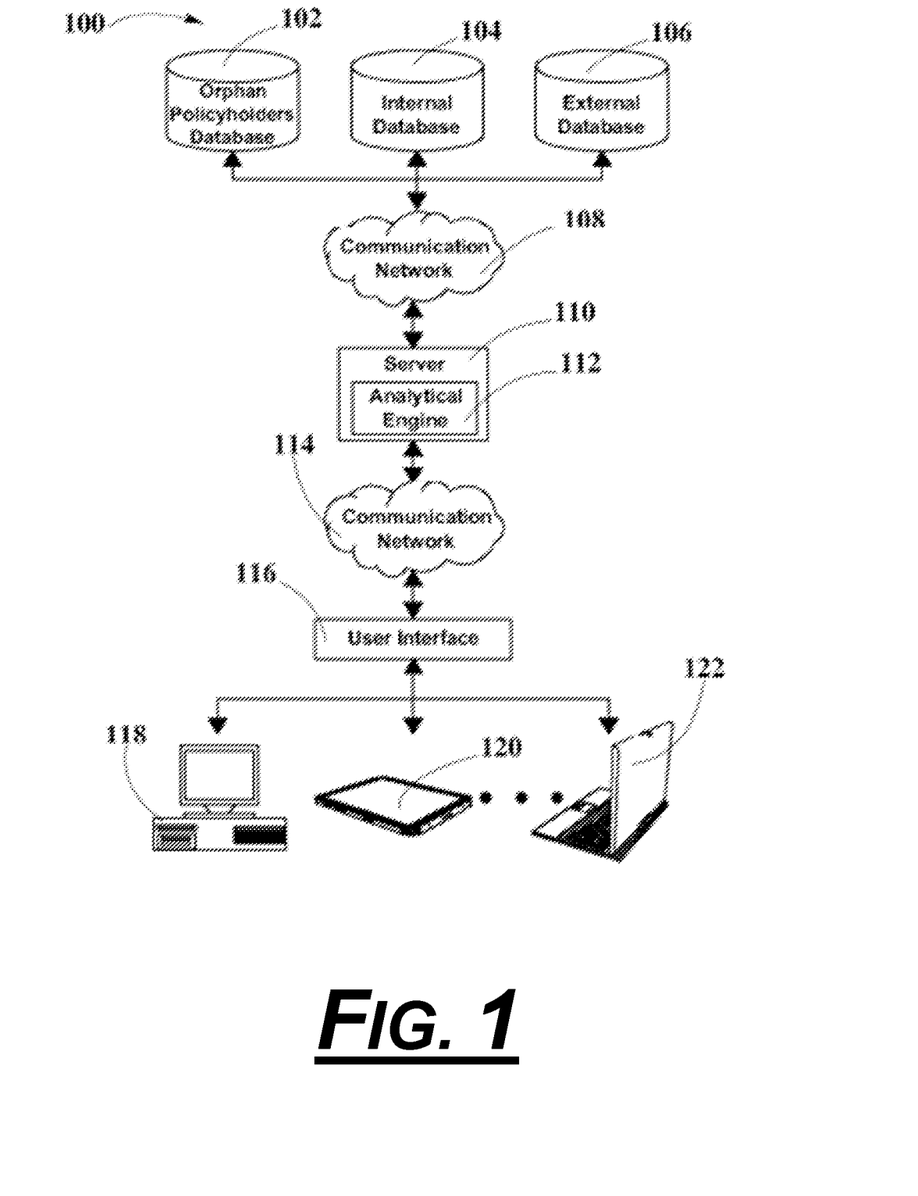
FIG. 1 is a block diagram illustrating a system architecture for determining policyholders' needs, according to an embodiment.

FIG. 1 is a block diagram illustrating a system architecture that enables a system for determining orphan policyholder needs, according to an embodiment. In FIG. 1, system architecture 100 may be owned by an insurance company. System architecture 100 includes one or more orphan policyholders databases 102, one or more internal databases 104, one or more external databases 106, server 110, analytical engine 112, communications networks 108 and 114, and a plurality of client computing devices, such as client computing device 118, client computing device 120 and client computing device 122, among other components.

Server 110 and client computing devices 118, 120, and 122 are operatively coupled to each other through communication network 114. Server 110 is operatively coupled with orphan policyholder database 102, internal databases 104 and external databases 106 through communications network 108.

The orphan policy holder database 102 comprises records of orphan policy holders. An orphan policy holder can be an individual/company that was sold a policy by an agent who subsequently leaves the industry, the policyholder is no longer being serviced by the agent, or the agent no longer has a selling agreement with the issuing company. The records of orphan policyholders can be distinguished from records of other policyholders based upon agent information in the policyholder record. When the policyholder record indicates that the agent associated with that record is no longer affiliated with the entity maintaining the policyholder database (e.g., an issuing company), the record may be identified as an orphan policyholder record. When the policyholder record indicates that the agent associated with that record is no longer servicing the policyholder (e.g., change in jurisdiction of the agent, change in job function of the agent, extended length of time since last correspondence between agent and policyholder), then the record may be identified as an orphan policyholder record. In one embodiment, when the last correspondence in the record between the agent and the policyholder is above a threshold (e.g., 1 year, 5 years, 10 years), then the agent may be considered as no longer servicing the policyholder. Then the policyholder record indicates that the agent no longer has a selling agreement with the issuing company, the record may be identified as an orphan policyholder record. In each of these circumstances, the agent is no longer engaged with the policyholder, and the record in the policyholder database 102 reflects that the agent is no longer engaged. The systems and methods herein utilize the records identified as orphan policyholders in an attempt to re-engage these individuals or companies and obtain additional or new business.

In FIG. 1, internal database 104, external database 106, and orphan policyholder database 102 are implemented as a relational database that store information about both the data and how it is related. In this embodiment, internal database 102 stores data generated by one or more software modules, operating within the system for determining orphan policyholder needs. Furthermore, internal database 102, stores customer information, product information, and the like which analytical engine 112 uses for determining orphan policyholder needs, match insurance products to needs of orphan policyholders, evaluate propensity to buy, evaluate potential sales value, among other characteristics. In some embodiments, the system enables insurance companies to automatically market orphan policyholders with non-commissioned products. Orphan policyholder database 102, stores a previously identified orphan policyholder list. External database 104 refers to data that the system retrieves from external sources for determining orphan policyholder needs.

In one embodiment, the system for determining policyholder needs includes a plurality of software modules, including at least analytical engine 112. Software modules within the system for determining orphan policyholder needs are a set of computer instructions stored on a computer-readable medium and executed by central processing units that run computer executable program instructions or related algorithms. The software modules within the system for determining policyholder needs may display user interfaces 116 on client computing devices, so a user, such as a customer, and an operator may interact with the system for determining policyholder needs.

A user may interact with user interfaces 116 on client computing devices, via an input device, such as a touch screen, a mouse, a keyboard, and a keypad, among others. In some embodiments, the system for determining orphan policyholder needs may display additional user interfaces 120 on client computing devices that correspond to tasks not specific to processes described here. Client computing devices can be any computing device such as smartphones, desktop computers, laptop computers, tablets, PDAs, and/or another type of processor-controlled device that may receive, process, and/or transmit digital data.

In these embodiments, internal databases 104, orphan policyholders database 102, and external databases 106 are implemented through database management systems (DBMS), including MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that can organize collections of data. Communications network connections 108 and 114 may refer to any connection between computers including intranets, local area networks (LAN), virtual private networks (VPN), wireless area networks (WAN), the internet, and the like. Server 110, client computing devices 118, 120, and 122 comprise the necessary hardware and software to implement the aforementioned database and system elements. Examples of firmware and/or hardware and associated software enabling functionality of the aforementioned server 110 and plurality of client computing devices 118, 120, and 122 are detailed in FIG. 2, below.

In these embodiments, analytical engine 112 retrieves an orphan policyholder list from orphan policyholder database 102, retrieves customer information from internal database 104, retrieves additional information related to products and customers' from external database 106, determines orphan policyholder needs, and matches insurance products to needs of orphan policyholders.

Figure 2:
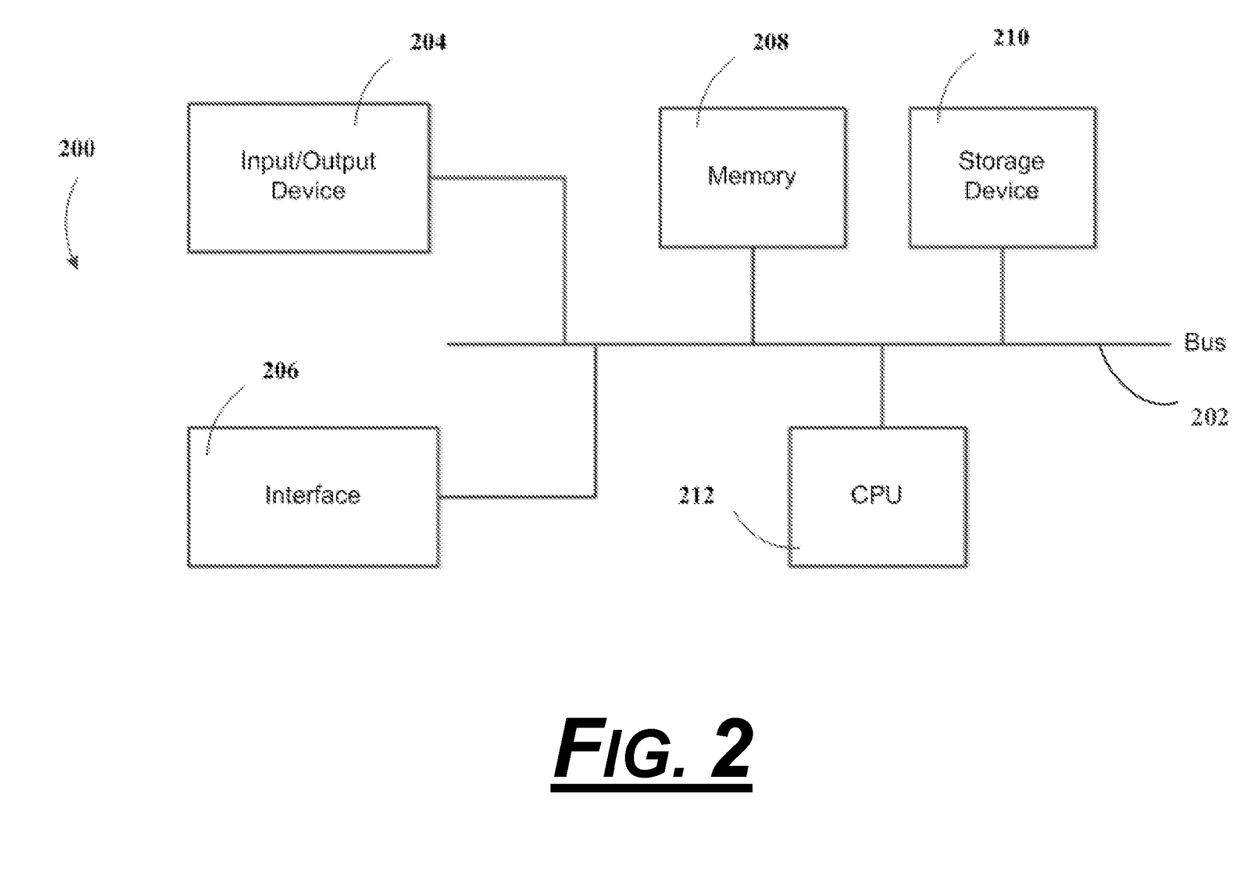
FIG. 2 is a block diagram illustrating an exemplary computing device in which one or more embodiments of the present disclosure may operate, according to an embodiment.

FIG. 2 is an exemplary computing device 200 in which one or more embodiments of the present disclosure operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that enable a user to input information to computing device 200, including a keyboard, computer mice, buttons, touch screens, voice recognition, and biometric mechanisms, and the like. (I/O) device 204 also includes a mechanism that outputs information to the user of computing device 200, such as, for example a display, a light emitting diode (LED), a printer, a speaker, and the like.

Examples of communication interface 206 include mechanisms that enable computing device 200 to communicate with other computing devices and/or systems through network connections. Examples of network connections include any connections between computers, such as, intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording medium, ferroelectric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, a client computing device, and the like. Examples of these implementations include servers, authorized computing devices, smartphones, desktop computers, laptop computers, tablet computers, PDAs, another type of processor-controlled device that may receive, process, transmit digital data, and the like. Additionally, computing device 200 may perform certain operations that are required for the proper operation of system architecture 100. Computing devices 200 may perform these operations in response to central processing unit 212 executing software instructions contained in a computer-readable medium, such as memory 208. In an example, and referring to FIG. 1, computing device 200 is implemented as server 108 and client computing devices 114, 116, and 118.

In one embodiment, the software instructions of the system for determining orphan policyholder needs are read into memory 208 from another memory location, such as storage device 210, or from another computing device 200 (e.g., server 108, client computing devices 114, 116 and 118, and the like) via communication interface 206. In this embodiment, the software instructions contained within memory 208 instruct central processing unit 212 to perform processes that will be described in FIG. 4, below. Alternatively, hardwired circuitry may be used in place of or in combination with software instructions to implement processes described herein. Thus, implementations described herein are not limited to any specific combination of hardware circuitry and software.

Figure 3:
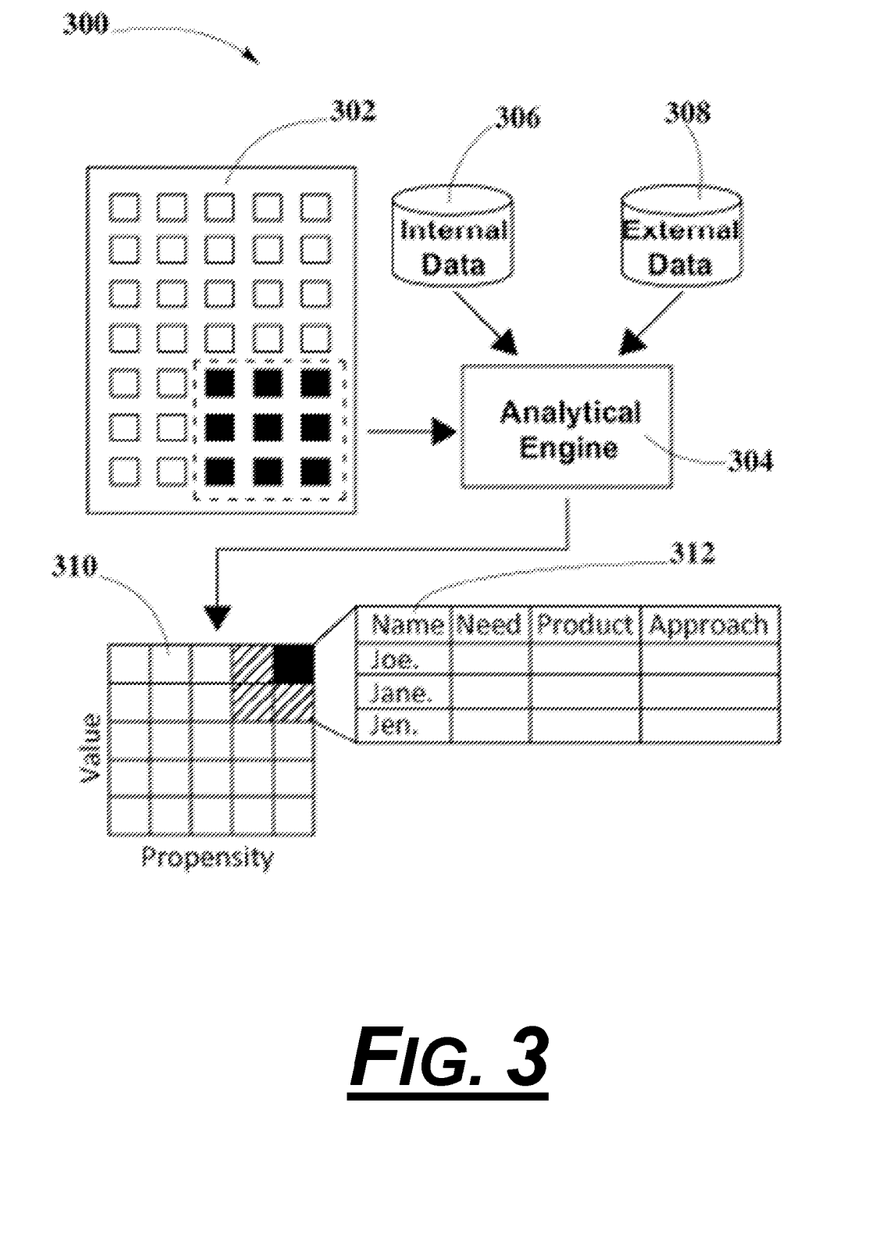
FIG. 3 is a block diagram illustrating a portion of a system architecture pertaining to an analytical engine for determining policyholders' needs, according to an embodiment.

FIG. 3 is a block diagram illustrating a subsystem of a portion of system architecture 100 of FIG. 1. In FIG. 3, subsystem 300 may belong to an insurance company and may be part of a system for determining policyholder needs, according to an embodiment. In one embodiment, subsystem 300 includes orphan policyholder database 302, analytical engine 304, external data 308, orphan policyholder list 310, and matching list 312.

In FIG. 3, analytical engine 304 is operatively coupled to and in communication with internal database 306 and external sources 308. Analytical engine 304 is implemented as one or more computer software modules that include programmatic rules or logic for matching insurance products to needs of orphan policyholders, evaluating propensity to buy, evaluating potential sales value, and enabling insurance companies to automatically market orphan policyholders with non-commissioned products. In other embodiments, analytical engine 304 displays a user interface on the screen of a client computing device that allows a user to manage analytical engine 304. In some embodiments, analytical engine 304 runs automatically on a scheduled basis. It should be understood that analytical engine 304 can include less components, more components, or different components depending on the desired analysis goals. In an example and referring to FIG. 1, said analytical engine 304 is implemented as a software module executed by server 108 within system architecture 100. In an additional example, and referring to FIG. 1, Internal database 306 orphan policyholders database 302, and external sources 308 are implemented as internal databases 104, orphan policyholders databases 102, and external databases 106.

In some embodiments, analytical engine 304 maps individual orphan policyholder values and propensity to commit to sales to produce graph 310 and may produce a matching list 312. Matching list 312 may be stored at internal database 306 for further use. Examples of such uses include financial, marketing, and sales management, among others.

External sources 308 may include social networks, bank or credit card statements, websites, third party data vendors, companies and/or organizations, in-bound or out-bound customer contact, mobile applications, an internal customer management system (CRM), and contract and/or policy, among others.

Internal database 306 and orphan policyholders database 302, and external sources 308 may be implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Figure 4:
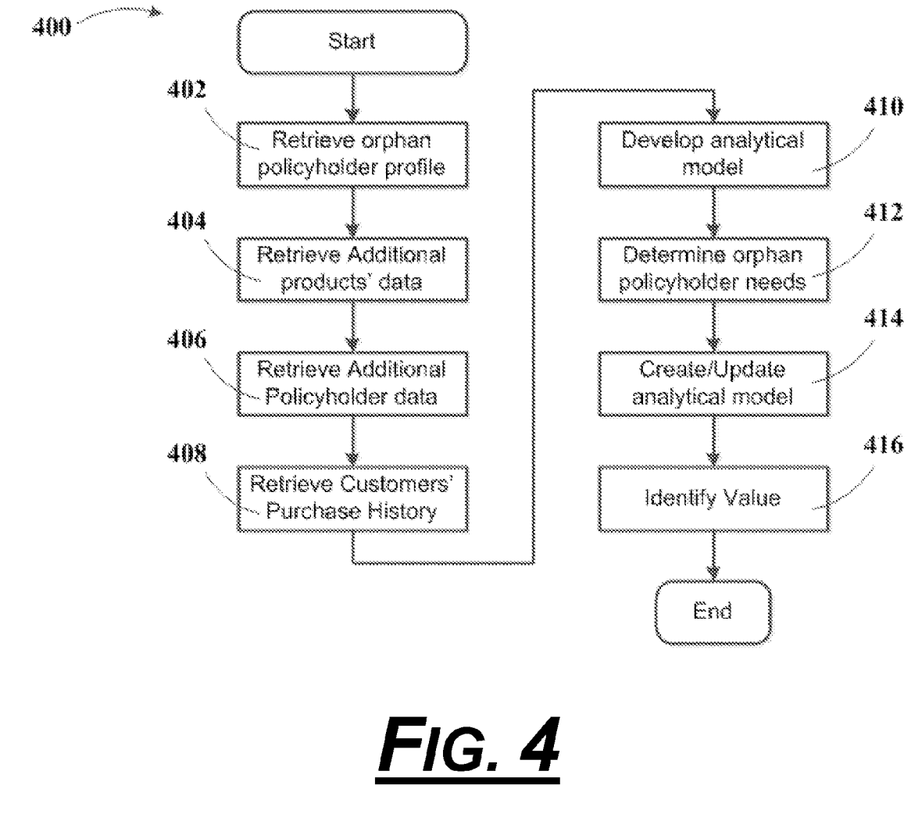
FIG. 4 is a flowchart of a process for matching insurance products to policyholder's needs, according to an embodiment.

FIG. 4 is a flowchart of a process for determining orphan policyholder needs. Process 400 describes a process to retrieve orphan policyholders from a company database and determine orphan policyholder needs. In some embodiments, a software module such as analytical engine 304 in FIG. 3, is configured within a computing device such as server 108 of FIG. 1 to perform process 300 to automated analysis on a dataset to determine needs of orphan policyholders, evaluate propensity to buy, evaluate potential sales value, and enable insurance companies to automatically market orphan policyholders with non-commissioned products, and is one means for performing this function.

Process 400 begins at step 402. At step 402, process 400 retrieves a set of orphan policyholder profiles and associated data. In one embodiment an analytical engine running on a server or plurality of servers retrieves a set of orphan policyholders profiles and associated data from an internal database. Information associated with the profiles include age, geography, total insurance, gender, months as a customer, income, life events (marriage, and home ownership, among others). Process 400 advances to step 404.

At step 404, the analytical engine retrieves information about insurance products that may be offered by the insurance company. Information about the products include name of the products, type of products (e.g., life insurance, insurance riders, term insurance), and products categories, among others. Process 400 advances to step 406

Additional policy holder data from external sources may be retrieved from external sources at step 406. Additional policyholder data retrieved from external sources include data from social networks, bank or credit card statements, websites, third party data vendors, companies and/or organizations, in-bound or out-bound customer contact, mobile applications, an internal customer management system (CRM), and contract and/or policy, among others. Process 400 advances to step 408.

Customer's purchasing history is retrieved from internal database at step 408. Customer purchasing history includes a list of products bought by the customer, type of products, whether the products lapsed or not, whether the policyholder is still covered by that product or not, and the like. Process 400 advances to step 410.

In step 410, process 400 develops an analytical model for orphan policyholders. In one embodiment, an analytical engine breaks down retrieved profiles, data from available insurance products, additional policyholder data, and customers' purchase history to develop an analytical model at step 410. Data associated with orphan policyholders may include age, geography, total insurance, gender, months as a customer, income, life events (marriage, and home ownership, among others).

The analytical engine may employ recommending techniques including collaborative filtering techniques to develop the analytical model. In one embodiment, the collaborative filtering technique used may be UV decomposition. In yet another embodiment, the collaborative filtering technique may be K-Nearest Neighbor (KNN). In yet another embodiment, a comparable collaborative filtering technique may be used. Additionally, an algorithm such as stochastic gradient descent (SGD) may be used by the analytical engine to train the analytical model. The model may include information that may relate to the orphan policyholder's potentially perceived need for purchasing additional insurance.

In one embodiment, UV decomposition may be implemented on a sparsely populated matrix [M] (blank entries may represent orphan policyholders not having an associated insurance product) that may include the distinct orphan policyholders and the features that may relate to them. The analytical engine may estimate a pair of matrices [U] and [V] as the factors of [M] by employing the SGD algorithm. The analytical engine may evaluate how close the dot product of [U] and [V] may be to [M] by calculating the root-means-square error (RMSE), which may include the steps of adding the square of differences between all non-blank entries in [M] and the corresponding entry in [U].[V], later taking the mean of these squares by dividing the number of terms in the sum, and finally taking the square root of the mean. The algorithm may halt when a predetermined minimum value is found for the RMSE. The analytical engine may utilize matrices [U] and [V] to update the analytical model which in turn may allow the analytical engine to determine the blanks in matrix M which may enable the analytical engine to determine the needs of orphan policyholders.

In another embodiment, KNN may be implemented on a sparsely populated matrix [M]. The algorithm may determine the pairwise distance between all orphan policyholders. Each orphan policyholders need may be determined by the analytical engine by computing the fraction of the nearest neighbors that own a particular insurance product.

In step 412, process 400 determines the financial and insurance need of orphan policyholders. In one embodiment, an analytical engine uses analytical model and a set of orphan policyholders' profiles to insights to determine orphan policyholders needs at step 412.

Further along the process, at step 414, the analytical engine may create and/or update the analytical model, the identified needs, and store it in the internal database. Additionally, potential value may be calculated as part of the process at step 416. Information stored in internal database may include identified insurance needs, and the potential value and propensity to sell the associated product. Results obtained may depend on the technique being employed and the purpose of the data being produced, and the formula used to calculate the potential sales value. Variables to consider while calculating the potential sales value may include value of new business (VNB), reduction on insurance products lapse, increase in referrals, and increase in sales, among others.

In one embodiment, the analytical engine employs big data techniques as well as internal database and external sources, to determine orphan policyholder needs and store them back in internal database. The analytical engine may use collaborative filtering techniques and learning algorithms, to identify orphan policyholder needs, match insurance products to those needs, evaluate propensity for repeat sales, and potential value, as well as insights in preferred marketing approach, among other metrics. Information input which may be taken from orphan policyholder profile by the analytical engine may include home info, tax records, previous purchases, credit info, age, sex, among others. External sources data may include advertising information, policyholder's additional information among others.

By executing process 400 through the exemplary operating environments shown in FIGS. 1-3, big data analytics and data mining techniques can be implemented for a more efficient and faster processing of larger data sets. In this way, efficiencies are created by providing the financial or insurance company with ways to automatically match insurance products to needs of orphan policyholders, evaluate propensity to buy, evaluate potential sales value, among other characteristics, and enable insurance companies to automatically market orphan policyholders with non-commissioned products. These features allow performing large work such as heavy calculations and time consuming analysis in a more efficient manner than other approaches such as manual work performed by humans.

Examples

Example #1 is an embodiment of a process 400, in which the analysis performed at step 414 may be performed for marketing purposes; the results obtained as well as the preferred marketing approach may be made available to sales department for further contacting the highest ranked orphan policyholders.

Example #2 is an embodiment of a process 400, in which the analysis performed at step 414 may be used for developing high quality sales leads. The developed leads may be made available to experienced agents for a fee in order to increase the odds of reengaging orphan policyholders with new business.

Example #3 is an embodiment of a process 400, in which the analysis performed at step 416 may be used for evaluating the potential value of re-engaging orphan policyholders; the weighed sum of all potential sales value may be an input for valuating the economics of initiating marketing campaigns for orphan policyholders.

In an example, an insurance issuing company may reengage with orphan policyholders using an orphan policyholder re-engagement system. The insurance company may have policyholder information stored inside a policyholder database. For example, orphan policyholder identification system (e.g., analytical engine) may crawl the policyholder database and/or other external databases to identify each orphan policyholder. In some embodiments, the disclosed orphan policyholder identification system may be able to collect data from internal and/or external data sources, such as social networks, bank or credit card statements, websites, companies and/or organizations, in-bound or out-bound customer contact, mobile applications, contract and/or policy, and agents, among others. Subsequently, this information may be stored in the policyholders database. The information may be analyzed using the predictive analytical engine in order to identify a list of potential orphan policyholders. Afterward, the list of potential orphan policyholders may be analyzed and classified through the analytical engine to generate a list of identified orphan policyholders. This list of identified orphan policyholders may be used for different purposes including financial information, and marketing information, among others.

The analytical engine may then evaluate the needs of each group taking into account information from internal data sources, such as the current product offered by the issuing company as well as external data sources, such as products offered by competing companies. The analytical engine may then determine one or more appropriate products that may satisfy the different orphan policyholder needs. The analytical engine may also create a new product that may satisfy the different orphan policyholder needs. A process of reengagement of orphan policyholders may continue when a marketing campaign sub-system (e.g., a module of the analytical engine) creates an appropriate marketing campaign that may attract orphan policyholders to reengage relations with the issuing company. Emails may be automatically sent by a marketing campaign sub-system to all orphan policyholders. The email may contain information related to the product that was tailored to the orphan policyholder needs and a link to a website, which serves as an automated transaction platform from where the products may be purchased. Whenever an orphan policyholder is interested in the new product, they may access the automated transaction platform from where they may purchase a product. Once the product is purchased, an ongoing service module may continually remind the customer about new offers, new products, payments due, etc.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-executed method comprising:
   receiving, by an analytical engine of a computer and from a first internal database configured to store profile data associated with one or more users, profile data associated with a first user;
   identifying, by the analytical engine of the computer, that the first user is not associated with a first employee based on the profile data associated with the first user;
   crawling, by the analytical engine of the computer, a plurality of social networking databases to collect additional data associated with the first user;
   receiving, by the analytical engine of the computer, from a second internal database that is configured to store product data and purchase history data corresponding to the one or more users, product data and purchase history data corresponding to the first user;
   generating, by the analytical engine of the computer, an analytical model that determines recommended products matching potential needs associated with the one or more users using collaborative filtering techniques by analyzing user profiles, the product data, the additional data, and the purchase history data associated with the one or more users;
   determining, by the analytical engine of the computer, a recommended product for the first user by executing the analytical model based on the first user profile, the product data, the additional data obtained from the crawling, and the purchase history data associated with the first user; and
   automatically initiating, by the computer, an automated communication session with a computing device operated by the first user to offer the recommended product to the first user by transmitting an email message containing a hyperlink directing the first user to a website displaying data associated with the recommended product.

2. The method of claim 1, wherein the profile data includes at least one of age, geography, total insurance, gender, months as a customer, income, and life events.

3. The method of claim 1, wherein the purchase history data includes at least one of an address, tax records, purchase history, and credit history of the first user.

4. The method of claim 1, wherein the collaborative filtering technique is a K-Nearest Neighbor algorithm.

5. The method of claim 1, wherein the collaborative filtering technique is UV decomposition.

6. The method of claim 1, further comprising training the analytical model, by the analytical engine of the computer, by executing a stochastic gradient descent algorithm.

7. A system comprising:
a computer readable memory having stored thereon computer executable instructions for matching a product to a user; and
a computer coupled to the memory, the computer executing the instructions performing steps including:
receiving, by an analytical engine of a computer and from a first internal database configured to store profile data associated with one or more users, profile data associated with a first user;
identifying, by the analytical engine of the computer, that the first user is not associated with a first employee based on the profile data associated with the first user;
crawling, by the analytical engine of the computer, a plurality of social networking databases to collect additional data associated with the first user;
receiving, by the analytical engine of the computer, from a second internal database that is configured to store product data and purchase history data corresponding to the one or more users, product data and purchase history data corresponding to the first user;
generating, by the analytical engine of the computer, an analytical model that determines recommended products matching potential needs associated with the one or more users using collaborative filtering techniques by analyzing user profiles, the product data, the additional data, and the purchase history data associated with the one or more users;
determining, by the analytical engine of the computer, a recommended product for the first user by executing the analytical model based on the first user profile, the product data, the additional data obtained from the crawling web-crawling, and the purchase history data associated with the first user; and
automatically initiating, by the computer, an automated communication session with a computing device operated by the first user to offer the recommended product to the first user by transmitting an email message containing a hyperlink directing the first user to a website displaying data associated with the recommended product.

8. The system of claim 7, wherein the profile data includes at least one of age, geography, total insurance, gender, months as a customer, income, and life events.

9. The system of claim 7, wherein the purchase history data includes at least one of an address, tax records, purchase history, and credit history of the first user.

10. The system of claim 7, wherein the collaborative filtering technique is a K-Nearest Neighbor algorithm.

11. The system of claim 7, wherein the collaborative filtering technique is UV decomposition.

12. The system of claim 7, further comprising training the analytical model, by the analytical engine of the computer, by executing a stochastic gradient descent algorithm.

* * * * *